(12) United States Patent
Brajovic

(10) Patent No.: US 7,512,861 B2
(45) Date of Patent: Mar. 31, 2009

(54) METHOD FOR DETERMINING IDENTITY OF SIMULTANEOUS EVENTS AND APPLICATIONS TO IMAGE SENSING AND A/D CONVERSION

(76) Inventor: Vladimir Brajovic, 513 Harrogate Rd., Pittsburgh, PA (US) 15241

( * ) Notice: Subject to any disclaimer, the term of this patent is extended or adjusted under 35 U.S.C. 154(b) by 444 days.

(21) Appl. No.: 11/133,091

(22) Filed: May 19, 2005

(65) Prior Publication Data

US 2005/0273661 A1 Dec. 8, 2005

Related U.S. Application Data

(60) Provisional application No. 60/572,857, filed on May 20, 2004.

(51) Int. Cl.
*G06F 11/00* (2006.01)
(52) U.S. Cl. .................. 714/752; 703/230; 375/141
(58) Field of Classification Search .................. 714/752
See application file for complete search history.

(56) References Cited

U.S. PATENT DOCUMENTS

| | | | | |
|---|---|---|---|---|
| 3,404,379 A * | 10/1968 | Lhermite | .................. | 713/501 |
| 3,812,462 A * | 5/1974 | Crossland et al. | ........... | 375/223 |
| 4,158,505 A * | 6/1979 | Mathisen et al. | ............. | 356/308 |
| 4,642,639 A * | 2/1987 | Nelson | ......................... | 342/47 |
| 4,755,680 A * | 7/1988 | Logan | ................... | 250/363.01 |
| 5,003,539 A * | 3/1991 | Takemoto et al. | ........... | 714/785 |
| 5,307,356 A * | 4/1994 | Fifield | ........................ | 714/765 |
| 5,404,556 A | 4/1995 | Mahowald et al. | | |
| 5,448,688 A * | 9/1995 | Hemingway | ................. | 345/441 |
| 5,473,708 A * | 12/1995 | Werth | ........................ | 382/160 |
| 5,699,278 A | 12/1997 | Brajovic | | |
| 6,188,699 B1 * | 2/2001 | Lang et al. | .................. | 370/463 |
| 6,192,441 B1 * | 2/2001 | Athenes et al. | ............. | 710/262 |
| 6,651,242 B1 * | 11/2003 | Hebbagodi et al. | .......... | 717/127 |
| 6,660,989 B2 | 12/2003 | Guo et al. | | |
| 6,754,852 B2 * | 6/2004 | Swoboda | ..................... | 714/39 |
| 7,139,959 B2 * | 11/2006 | Hocevar | ..................... | 714/752 |
| 2002/0169867 A1 * | 11/2002 | Mann et al. | .................. | 709/224 |
| 2002/0185605 A1 * | 12/2002 | Shuman et al. | .......... | 250/341.7 |
| 2003/0165212 A1 * | 9/2003 | Maglich | ..................... | 376/156 |

OTHER PUBLICATIONS

A. Mortara et al., "A Communication Scheme for Analog VLSI Perceptive Systems," *IEEE Journal of Solid-State Circuits*, vol. 30, No. 6, Jun. 1995, pp. 660-669.

S. R. Deiss et al., "A Pulse-Coded Communications Infrastructure for Neuromorphic Systems," in *Pulsed Neural Networks*, W. Maass and C. M. Bishop, Eds., Cambridge, MA: MIT Press, 1999, ch. 6, pp. 157-178.

(Continued)

*Primary Examiner*—Esaw T Abraham
*Assistant Examiner*—Enam Ahmed
(74) *Attorney, Agent, or Firm*—Robert P. Lenart, Esq.; Pietragallo Gordon Alfano Bosick & Raspanti, LLP

(57) ABSTRACT

A method of encoding identity of events comprises: receiving an event bit pattern having bits representative of events, and determining a code from the event bit pattern, said code containing the information for recovering identity of events when one or more events are simultaneously present in the event bit pattern.

44 Claims, 13 Drawing Sheets

OTHER PUBLICATIONS

K. A. Boahen, "Point-to-Point Connectivity Between Neuromorphic Chips Using Address Events," *IEEE Transactions on Circuits and Systems—II: Analog and Digital Signal Processing*, vol. 47, No. 5, May 2000, pp. 416-434.

O. Landolt et al., "Visual Sensor With Resolution Enhancement by Mechanical Vibrations," *IEEE*, 2001, pp. 249-264.

E. Culurciello et al., "Arbitrated Address-Event Representation Digital Image Sensor," *Electronics Letters*, vol. 37, No. 24, Nov. 22, 2001, pp. 1443-1445.

* cited by examiner $$H = \begin{bmatrix} 1 & 0 & 0 & 0 & 1 & 0 & 0 & 1 & 1 & 0 & 1 & 0 & 1 & 1 & 1 \\ 0 & 1 & 0 & 0 & 1 & 1 & 0 & 1 & 0 & 1 & 1 & 1 & 1 & 0 & 0 \\ 0 & 0 & 1 & 0 & 0 & 1 & 1 & 0 & 1 & 0 & 1 & 1 & 1 & 1 & 0 \\ 0 & 0 & 0 & 1 & 0 & 0 & 1 & 1 & 0 & 1 & 0 & 1 & 1 & 1 & 1 \\ 1 & 0 & 0 & 0 & 1 & 1 & 0 & 0 & 0 & 1 & 1 & 0 & 0 & 0 & 1 \\ 0 & 0 & 0 & 1 & 1 & 0 & 0 & 0 & 1 & 1 & 0 & 0 & 0 & 1 & 1 \\ 0 & 0 & 1 & 0 & 1 & 0 & 0 & 1 & 0 & 1 & 0 & 0 & 1 & 0 & 1 \\ 0 & 1 & 1 & 1 & 1 & 0 & 1 & 1 & 1 & 1 & 0 & 1 & 1 & 1 & 1 \end{bmatrix} \overset{15}{\nwarrow}$$

$\underline{s} = H\underline{e}$

METHOD FOR DETERMINING IDENTITY OF SIMULTANEOUS EVENTS AND APPLICATIONS TO IMAGE SENSING AND A/D CONVERSION

CROSS REFERENCE TO RELATED APPLICATIONS

This application claims the benefit of U.S. Provisional Patent Application Ser. No. 60/572,857 filed May 20, 2004, which is hereby incorporated by reference.

STATEMENT REGARDING FEDERALLY SPONSORED RESEARCH OR DEVELOPMENT

The present invention was supported by the National Science Foundation under the Contract Nos. 0082364 and 0102272. The United States Government has certain rights in this invention.

FIELD OF THE INVENTION

The present invention relates to methods and apparatus for encoding events, and more particularly to such methods and apparatus that are capable of determining the identity of multiple simultaneous events in a single snap-shot without requiring arbitration.

BACKGROUND OF THE INVENTION

It has been proposed, that an address-event representation (AER) would be appropriate for communicating between plurality of senders and receivers, especially in cases where the number of senders and receivers residing on separate integrated circuit exceeds the wiring capability available between the integrated circuits (see U.S. Pat. No. 5,404,556). This approach has been originally proposed in the context of communicating neuronal activity of many artificial neurons from one chip to another. When a neuron fires a pulse (i.e., an "event") on an event bus, the identity of a firing neuron (i.e., its "address") could be communicated to the second chip. Since time is inherently measured across the entire system, the neuronal activity expressed in temporal periods and firing rates can be communicated to a second chip. Alternatively, time stamps could be associated with each address to preserve event timing in irregular pipelined systems.

Biological neurons fire infrequently, from a few Hz to a couple of hundred Hz. This signaling scheme saves energy in biological systems, but leaves neuronal "wiring" underutilized. It has been suggested that the speed of electronic circuits can be traded for the connectivity of nervous systems by sharing a few wires to communicate (infrequent) events from many artificial neurons while still preserving the timing of events to a very fine time scale (Mead, C. A., "Analog VLSI and Neural System", Addison-Wesley, 1989). In fact, due to this wire resource sharing, signaling rates in artificial perceptual systems can be in order of 10 MHz (see Culurciello et al.: "Arbitrated Address-event representation digital image sensor", Electronic Letters, Vol 37, No. 24, November 2001, pp. 1443-1445, and Landolt et al.: "Visual sensor with resolution enhancement by mechanical vibrations," Proc. Conf. on Advanced Research in VLSI, 2001, pp 249-264).

There can be thousands of neurons firing their "events" on thousands of wires of an event bus. The task of an address-event encoder is to receive these many events, correlate the precise timing of their onset with the identity of the corresponding neuron, and timely communicate address-event pairs off-chip. It is trivial to encode an address of a single firing neuron. A problem arises when several neurons fire simultaneously thus causing event collisions at the address-event encoder and shared wiring resources.

There are two existing techniques that address the problem of address-event coding when simultaneous events occur on the event bus: arbitration and collision detection.

The first technique originally proposed by Mahowald (U.S. Pat. No. 5,404,556) and subsequently further developed by several researchers arbitrates among colliding events (see Boahen, "Point-to-point connectivity between neuromorphic chips using address events," IEEE Tran. Circuits and Systems II, Vol. 47, No. 5, May 2000, pp. 416-434; and Deiss et al.: "A pulse-coded communications infrastructure for neuromorphic systems," in Pulsed Nerual Networks, Maass and Bishop (eds.), The MIT Press, 1999.) It selects one event at a time, encodes that event's address, and communicates the address off chip. A binary tree search implemented in a circuit has been proposed to speed up the event selection process. Still this search takes time that is at best proportional to the number of events queued for arbitration. During that time, new events could be arriving and joining the arbitration process, causing the system to lose time associated with each event. Although a new event originates at a later point in time, as it enters the arbitration process it could be selected and read before the older event, that is still waiting a selection. One remedy for this time confusion is to latch the event bus thus keeping new events from entering the selection process until the current set of events is completely encoded. Still, some time uncertainty remains because while the current set of events is being examined, new events are queuing in the background. The time at which these new events fired is not precisely known. The best one can say is that they fired during the time period the previous set of events was handled. Furthermore, as time is spent to arbitrate events in one bus state, the chance that there will be collisions in the next bus state increases. The faster one can examine each bus state, the less chance for many collisions in the incoming event bus state. In fact, in extreme situations, the arbiter may just partially encode some events, discard the remaining events, and move on to the next sample.

Two image sensors using this kind of arbitrated address-event coding have been proposed: 1) Culurciello et al.: "Arbitrated Address-event representation digital image sensor", Electronic Letters, Vol 37, No. 24, November 2001, pp. 1443-1445, and 2) U.S. Pat. No. 6,660,989. In the first approach pixels in an array fire at a rate that is proportional to their illumination. The arbitrated address-event encoder communicates this activity to the outside of the array. In the invention of U.S. Pat. No. 6,660,989 inventors use the method proposed by my earlier invention (U.S. Pat. No. 5,699,278) in which a single event is generated by each pixel after its reset time. U.S. Pat. No. 6,660,989 mentions that due to limited throughput of arbitrated address-event coding, the technique may be appropriate only for small imagers, recognizing the problem with arbitrated address-event encoding for large number of input events.

The second method for address-encoding—the collision detection address-event—was proposed in Mortara et al. "A communication scheme for analog VLSI perceptive systems," IEEE Jour. Solid-State Circuits, Vol. 30, No. 6, June 1995, pp. 660-669. This method does not arbitrate but uses a binary encoder with a special collision detection code. This allows the event bus to frequently produce event addresses, but only when a single event occurs. When a single event occurs, the encoder provides a "valid" code whose value indicates the address of the event. This is communicated to the second chip. When a collision occurs on the event bus, the encoder provides an "out-of-valid-set" code indicating that the collision occurred. Generally, it is not possible to tell from this code how many and which events collided. All that can be concluded is that the collision occurred and that the system should not trust the produced code to encode any events. The encoder uses about (log 2N+2) bits to detect collision on an event bus with N wires. For example, a 1000-wire event bus would require about 10+2=12 bits. The 2 bits are necessary overhead to provide collision detection.

The collision detection address-event method has the advantage of providing event addresses within a small temporal snapshot (e.g., propagation delay of the encoder of about a few nanoseconds.) Unlike with the arbitrated approach, this technique minimizes the chance of collisions in the next time increment. However this technique is "lossy" address-event encoding since the identity of the colliding events will be unrecoverable. The argument by neorumophic engineering researchers goes that the loss due to collisions in both arbitrated and non-arbitrated cases can be tolerated in a statistical sense as the neurons periodically generate new events that are unlikely to collide in another period, therefore the receiving circuits could still be able to reconstruct neural activity received from the sender chip. However there are many important applications where address-event could be beneficial but the loss or errors cannot be tolerated.

An object of the present invention is to provide an event address encoder for lossless and substantially instantaneous production of a code that contains the identity of plural colliding events. Such a coder is useful in multi-channel analog-to-digital conversion, image sensors, and other massively parallel systems whose "cells" need to communicate their internal activity or signal levels to the outside world.

SUMMARY OF THE INVENTION

This invention provides a method of encoding identity of events comprising: receiving an event bit pattern having bits representative of events, and determining a code from the event bit pattern, said code containing the information for recovering identity of events when one or more events are simultaneously present in the event bit pattern.

The invention also encompasses an apparatus comprising a plurality of inputs for receiving an event bit pattern having bits representative of events, an event encoder for receiving the event bit pattern and for producing a code containing the information for recovering identity of events when one or more events are simultaneously present in the event bit pattern, and a decoder for recovering event identities.

In another aspect, the invention provides an address encoder comprising a plurality of inputs for receiving an event bit pattern representative of events, a plurality of outputs, and a plurality of exclusive OR gates connected between the inputs and outputs, wherein the exclusive OR gates correspond to a parity matrix to produce a code on the outputs, the code containing the information for recovering identity of events when one or more events are simultaneously present in the event bit pattern.

The invention also encompasses an apparatus comprising means for generating an event bit pattern having bits representative of events, means for determining a code from the event bit pattern, said code containing the information for recovering identity of events when one or more events are simultaneously present in the event bit pattern, and a decoder for recovering the event identities.

In another aspect, the invention provides a method for determining identity of events comprising steps of communicating events as an event bit pattern to an event bus, and producing an event identity code with an event identity encoder on an event identity code bus, in response to said event bit pattern, said event identity code encoding the location of all active events in the event bit pattern.

The invention also encompasses a method for image sensing comprising the steps of receiving radiation with a plurality of radiation-sensitive event-generating cells disposed on a surface, generating an event with each event-generating cell at event times that are uniquely related to the received radiation by the each event-generating cell, producing the identity of generated events by the event identifying means, and storing the event identity with associated timestamps when the event occurred.

In yet another aspect, the invention provides a method for analog-to-digital conversion comprising the steps of receiving a physical quantity with a plurality of event-generating cells, generating an event with each event-generating cell at event times that are uniquely related to the received physical quantity by the each event-generating cell, producing the identity of generated events, and storing the event identity with associated timestamps when the event occurred

BRIEF DESCRIPTION OF THE DRAWINGS

A complete understanding of the present invention may be obtained by reference to the accompanying drawings, when considered in conjunction with the subsequent, detailed description, in which:

FIG. 5a shows the parity matrix for this special example, and FIG. 5b shows the structure of the event identity encoder for this example

FIG. 7a shows an asynchronous arrangement. FIG. 7b shows a synchronous, time-sampled arrangement.

FIG. 8a shows event generating cells that generate asynchronous events. FIG. 8b shows acknowledge signals to the cells to enable hand shaking between cells and the rest of the system.

FIG. 12a shows a general one-shot event generator controlled by impinging radiation. FIG. 12b is a more detailed diagram of one embodiment of a radiation-controlled one-shot event generator.

DETAILED DESCRIPTION OF THE INVENTION

Figure 1:
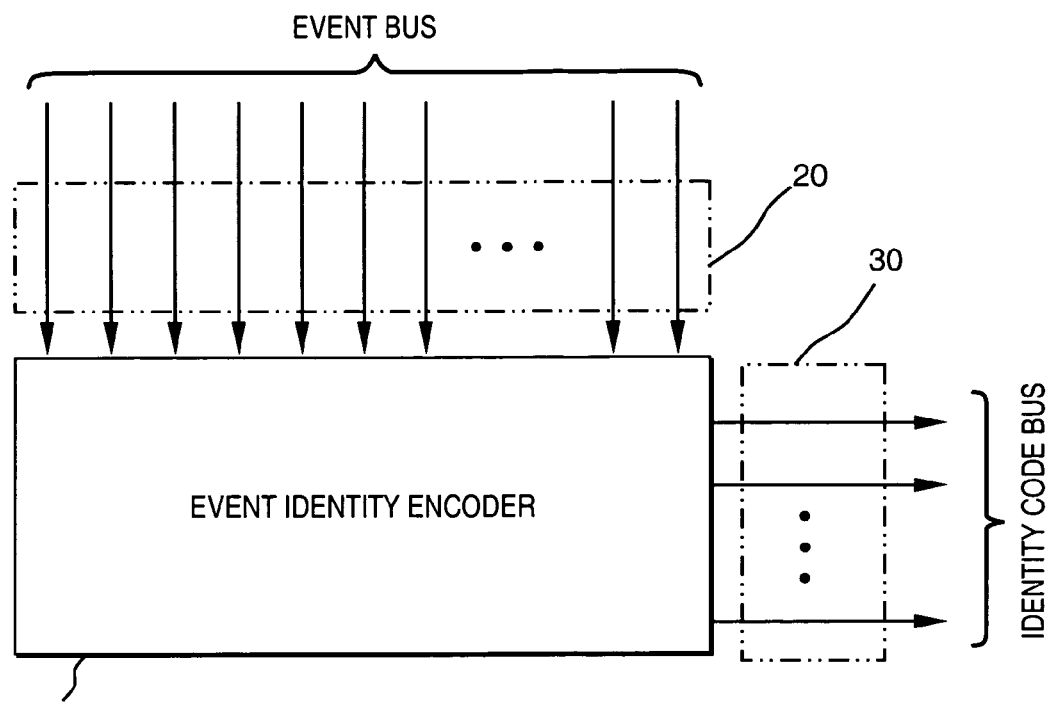
FIG. 1 shows an event identity encoder of the present invention.

Referring to the drawings in greater detail wherein like reference numerals refer to similar or identical parts throughout the various views, several preferred embodiments of the present invention and methods of practicing the present invention will be considered.

FIG. 1 shows a general view of the event identity encoder 10 of the present invention. The event identity encoder 10 receives events on an event bus 20 and produces an event identity code on the identity code bus 30. The presence of an event on any of the input wires of the event bus 20 can be represented with high voltages, or logic "ones" in one embodiment. The absence of the event on the event bus 20, then would be represented as a low voltage, or logic "zero". Thus, the event bus 20 receives a bit pattern that evolves in time. This bit pattern is representative of streaming events on the event bus 20. For given bit pattern distribution, the event identity encoder 10 produces an event identity code on the identity code bus 30. This code is produced as an instantaneous combination of the input event bit pattern on the event bus 20. Thus the event identity code is updated on the identity code bus 30 substantially at the time of the onset and/or termination of any particular event on the event bus 20.

Figure 2:
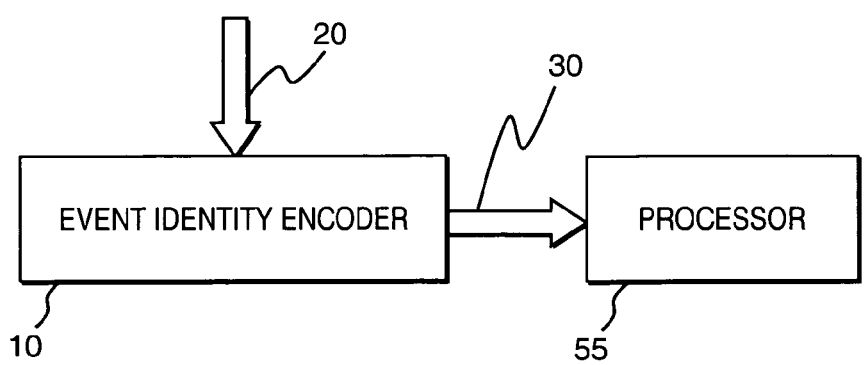
FIG. 2 is a block diagram, illustrating a general use of the event identity encoder of the present invention in a system.

The event identity code encodes the identity, or "addresses", of all simultaneously occurring events (or "ones") on the event bus 20 if any are present. The event identity code can also be referred to as "event address code" or simply "address code". If no events are present, the code indicates that as well. As shown in FIG. 2, the event identity code may be communicated to a processor 55 via the identity code bus 30. The multiple addresses of the simultaneously occurring events on the event bus are recoverable from the event identity code on the identity code bus 30 through decoding by the processor 55, so that the code can be used by the rest of the system. Since the evolution of time can be tracked across the entire system (not shown in FIG. 2, but shown later in FIGS. 7a and 7b), the processor can associate time with onset and termination of events thus generating so called "address-event representation" of the activity on the event bus 20. The address-event representation of this activity is useful in many applications as discussed in the background section. Processor 55 will involve customary modules that are necessary for its functioning and may involve one or more of the following: memory, register, digital logic, mixed mode electronics, central-processing unit, hardwired processing hardware and other necessary modules commonly known to those skilled in the art.

Figure 3:
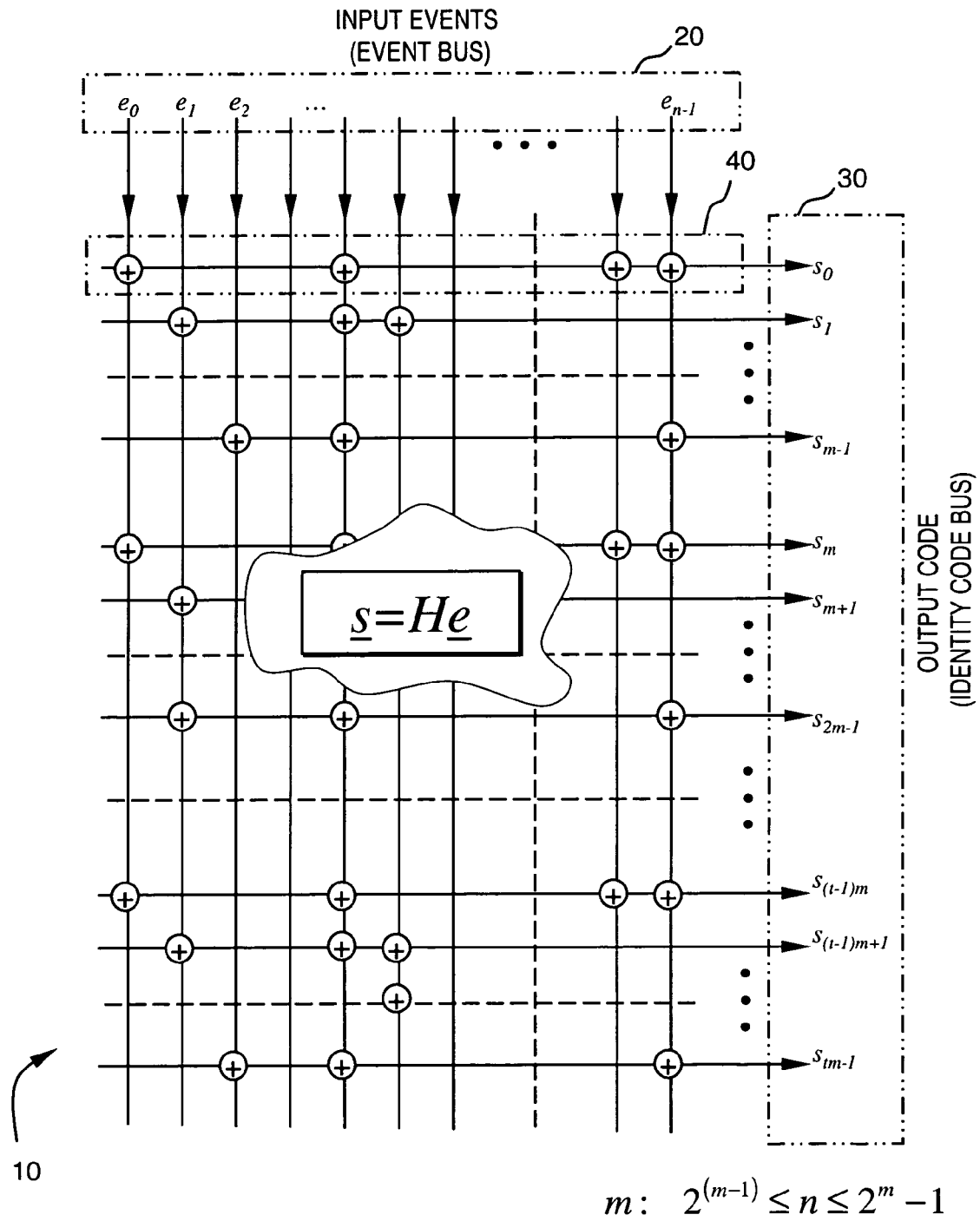
FIG. 3 is a detailed schematic illustration of the event identity encoder.

FIG. 3 shows a more detailed view of the event identity encoder 10. The event bus has n wires and is thus capable of monitoring n events that are used to produce an event bit pattern on the event bus 20. The encoder produces a code of size t·m where m is an integer such that $2^{(m-1)} \leq n \leq 2^m - 1$, and t is the upper limit on the number of the simultaneous events that the event identity encoder 10 can encode in its output code. m is determined by the size n of the event bus 20, while t is variable and determined by the encoder design. Given a particular application, a designer may chose to design for a large t, and the present invention allows for that. The event encoder 10 thus continuously provides a "lossless" code for telling the identity (i.e., address) of up to t simultaneously occurring, or colliding, events. If there are more than t simultaneous events, then their addresses are not recoverable and they are lost. The processor 55 is able to coherently make all of these conclusions solely from examining the code received via the event identity code bus 30.

Still referring to FIG. 3, the idea of the present invention is based on error correcting code (ECC) algebra over finite Galois Fields, GF(q), where q is either a prime p or a power of p. However, codes with symbols from the binary field GF(2) or its extension $GF(2^m)$ are most widely used in digital systems because information in these systems is universally coded in binary form for practical reasons. The present invention is not restricted to the binary case. Excellent treatment of error-correcting code theory can be found in 1) Lin, S., Costello, D., *Error Control Coding: Fundamentals and Applications*, Prentice-Hall, 1983, and 2) Berlekamp, E., *Algebraic Coding Theory*, Aegean Park Press, 1984, both of which are hereby incorporated by reference.

In ECC, k-information bits are encoded into an n-bit code c, where n>k. The n-k redundancy bits allow error correction at the receiver end. The received word r is a result of the channel inflicting bit errors onto the sent code word c, $$r = c + e$$

where e is the error pattern with a "1" at locations where the code word c bit was altered. In the GF(2) arithmetic '+' stands for a logical "exclusive OR" XOR, and multiplication stands for a logical AND. The receiver needs to answer the question "what was the transmitted code word c". It turns out that it is easier to answer the question "what was the error pattern e inflicted by the channel". Once the receiver knows e, it can "undo" the channel damage from r and recover c.

In order to recover e, the receiver usually computes a syndrome s of the received word r. For this purpose, the receiver can use a parity check matrix H. The matrix H is determined by the particular ECC code selected. The parity matrix H has the property that Hc=0. The syndrome is computed as:

$$s = Hr = H(c+e) = Hc + He = He$$

Generally, for ECC codes that can correct t bits in the code of length n: $2^{(m-1)} \leq n \leq 2^m - 1$, the syndrome is 2·t·m bits wide. In the binary case, however, it is t·m bits wide because some rows of general matrix H can be dropped and the syndrome can be calculated based on other rows of H. The decoding process in ECC theory deals with different ways to recover e from s.

Returning to the problem of recovering the identity of the events occurring on the event bus 20, one can observe that the error pattern e looks like the state of the event bus with "ones" where events occurred and "zeros" elsewhere. Therefore, by computing the syndrome as s=He, the exact pattern of e can be recovered from s, provided that there are no more than t "ones" on the event bus at any given time. FIG. 3 illustrates that the event identity code on the event identity code bus 30 is produced by combining the event signals from the event bus 20 to produce the syndrome s as s=He. As a brief example and analysis at the end of this description illustrates, it is statistically unlikely to observe too many simultaneous events, if any, within a 10 ns interval even for very rapidly firing neural nodes. Therefore, the size of the syndrome t·m is reasonable and easily implemented in VLSI. Usually, t·m is much less than n, that is t·m<n.

Figure 4A:
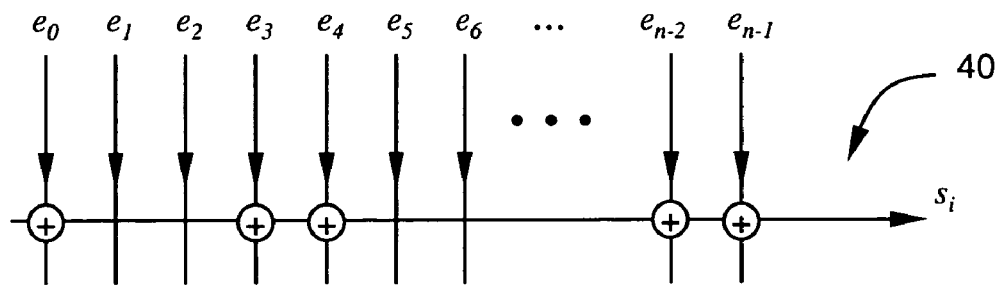
FIGS. 4a, 4b, and 4c are more detailed schematic diagrams that illustrate how a bit in the identity code bus of FIG. 3 is produced.
Figure 4B:
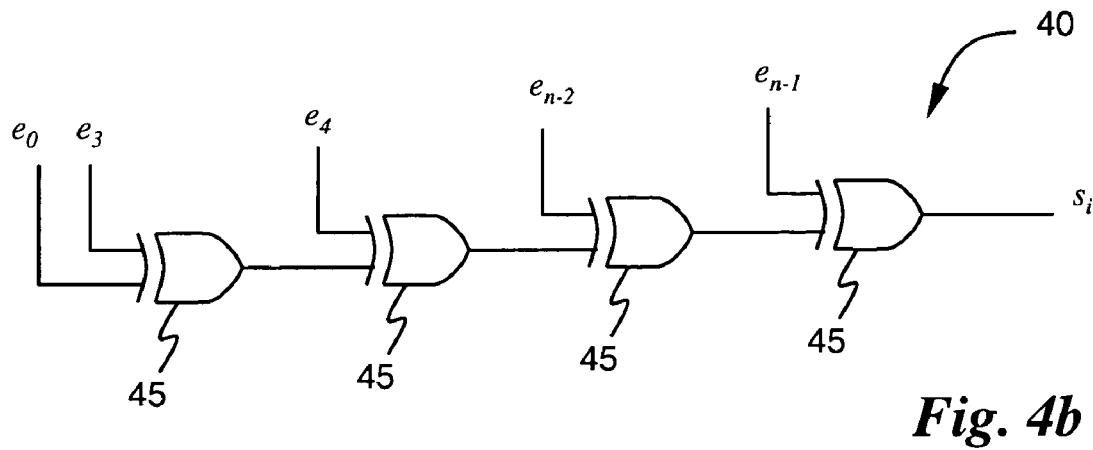
Figure 4C:
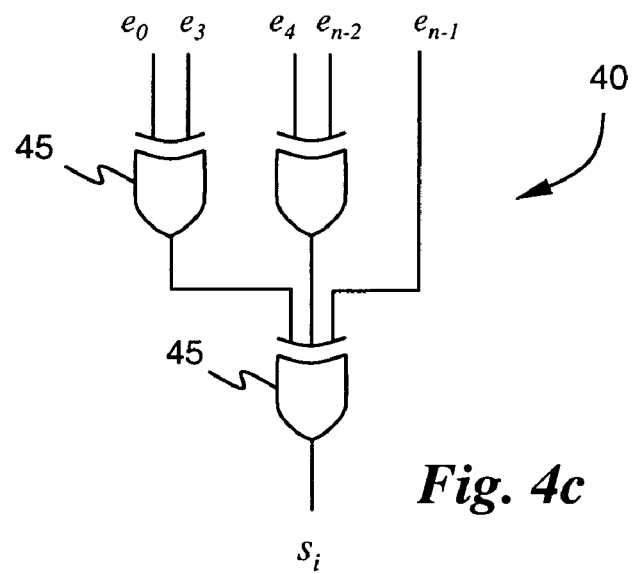

Each bit $s_i$ in the event identity code is produced as a logic combination of the bits in the event bit pattern on the event bus 20. This is performed with a parity-matrix network bit-slice 40 in FIG. 3. FIG. 4 shows several examples of how the parity-matrix network bit-slice 40 combines the event bit pattern. The particular combination of the event bits in FIG. 4 is only an illustration. A particular combination depends on the parity matrix H chosen, and is different for every code bit $s_i$. Normally a bit $s_i$ in the event identity code is produced as an XOR combination of certain event bits from the event bit pattern on the event bus 10. Which bits are combined is indicated by a corresponding row in matrix H. Any digital or analog network that will produce an appropriate XOR combination of the event bits is acceptable. FIG. 4b shows an example using several two-input XOR gates connected in series. FIG. 4b shows another example where two- and three-input XOR gates are arranged in a tree configuration to minimize the propagation delays. Those skilled in the art can find many alternative ways of producing the required bit $s_i$ and still fall within the scope of this invention. Even for large n (e.g., n=1024 or more) it is readily possible to achieve propagation delays of less than 10 ns (see Lin, K-J; Wu, C-W, "A low-cost realization of multiple-input exclusive-OR gates," Proc. of the 8th IEEE Intl. ASIC Conference, 1995, pp. 307-310.).

Figures 5A, 5B:
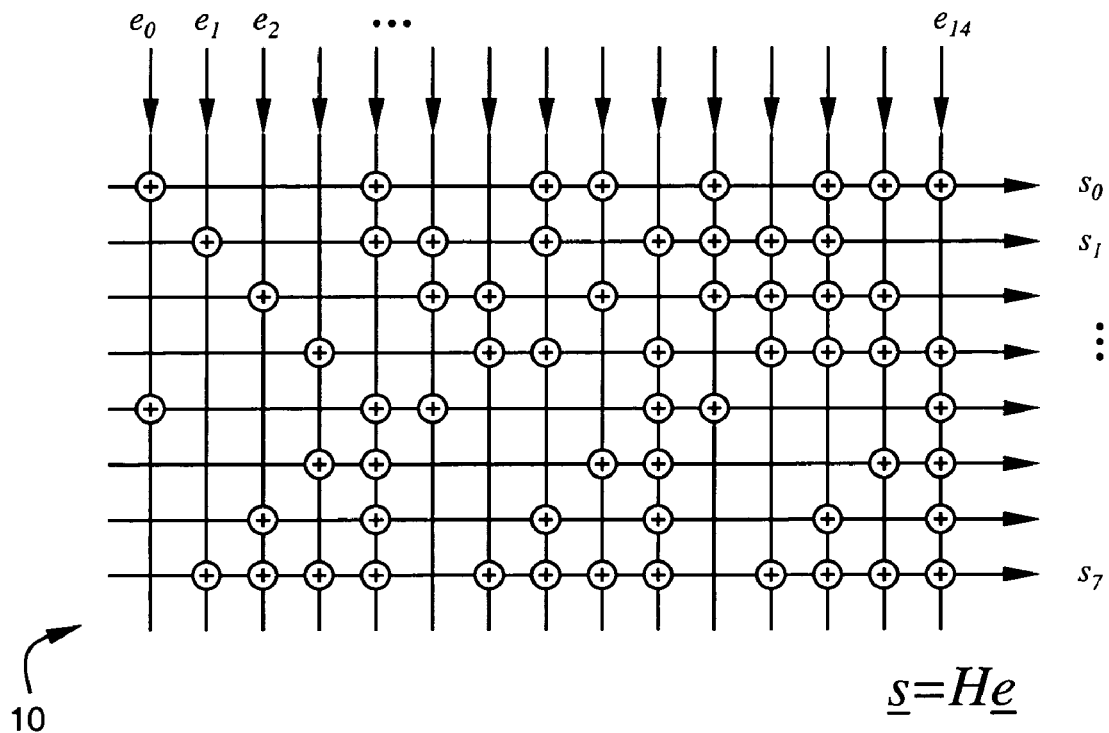
FIGS. 5a and 5b are a particular example of the event identity encoder which uses BCH error-correcting code with n=15, m=4, and t=2.

To further illustrate the operation of the event identity encoder, FIG. 5 shows one particular example of the event identity encoder 10. It is a case for n=15, (therefore m=4) and t=2. A Bose-Chaudhuri-Hocquenghem code—commonly known as "BCH code"—is illustrated in this example. FIG. 5a shows a parity matrix 15 for this example. FIG. 5b shows a schematic representation of the event identity encoder. The encoder in this particular example is able to monitor 15 events and encode the identity of up to t=2 simultaneously occurring events. It provides a code that is t·m=8 bits wide.

It is important to note that the event identity coder of the present invention scales well. The structure of the parity matrix H, does not change as additional rows are padded to enlarge its error detection capability t. For example, to detect only one occurring event, the parity matrix of the example shown in FIG. 5 would only retain the first 4 rows. Therefore, one can envision designing a parity matrix with a large encoding capability t. This could result in tens of bits for the event identity code. But the processor 55 may proceed to decode only the first half of the event identity code, for example. Then if the number of errors exceeds t/2, the second half of the event identity code would be also considered to gain the full event encoding capability t.

Those skilled in ECC art will realize that the present invention is not restricted to any particular ECC code. Any ECC code would work. Various ECC codes have various "good" and "bad" features in practice. Some are easier to decode than others; some are restricted to a certain size or error correcting capability, and so on. Which particular ECC code will be used depends on an application, but all of them fall within the scope of the present invention.

Notice that in conventional ECC practice, the syndrome is computed using the received word r. In fact, direct computation based on matrix H is rarely done. In communication systems, error correction hardware is structured to take advantage of the fact that the received bits are sequentially streaming into a receiver. In address-event coding of the present invention, a particular encoding of code words c is used to construct the parity check matrix H. Messages are never encoded and codes c are never sent, except for permanently presenting c=0 on the event bus 20. When events occur, the code c=0 becomes "corrupted" resulting in event bit pattern e. By decoding the event identity code s, we find locations of events in the bit pattern e and thus identify all simultaneously occurring events.

There are several ways to recover the identity of events from the event identity code produced by the encoder 10. Algorithmically the most efficient known methods are Berlekamp's iterative algorithm, and Chien's search algorithm (see ECC reference cited above). These would be appropriate for software implementation. For fast hardware implementation, the Euclidian algorithm or the majority-logic decoding may be more appropriate due to their regular structure. These and other decoding methods, depending on a particular ECC code used, are described in 1) Lin, S., Costello, D., *Error Control Coding: Fundamentals and Applications*, Prentice-Hall, 1983, and 2) Berlekamp, E., *Algebraic Coding Theory*, Aegean Park Press, 1984, both of which are incorporated by reference.

Figure 6A:
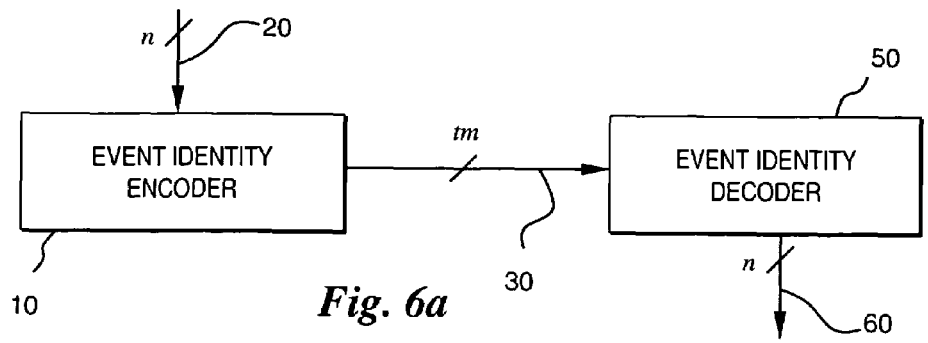
FIGS. 6a, 6b, and 6c are block diagrams that illustrate how the event identity code may be decoded and utilized.
Figure 6B:
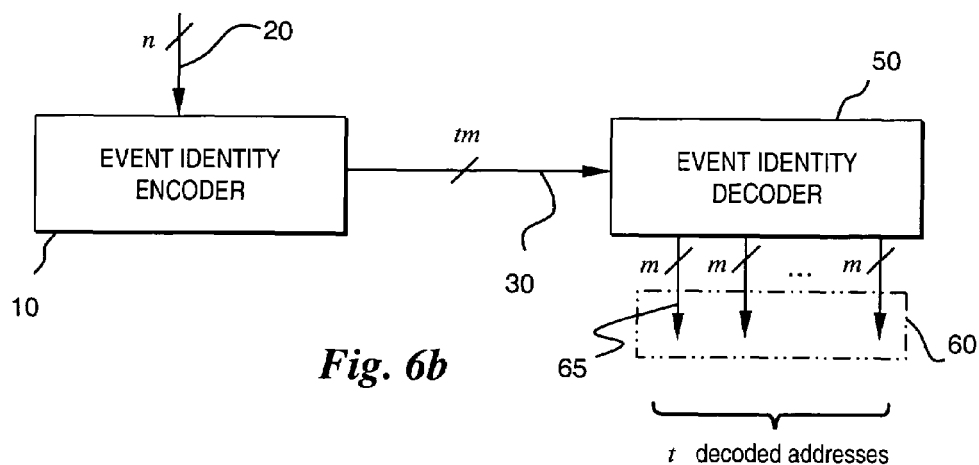

FIG. 6 shows how the event identity code may be decoded and used. An event identity decoder 50 may be included. In one embodiment (FIG. 6a) the event identity decoder 50 reconstructs the n wires of the event bus 20 in its entirety, producing the output event bus 60. In another embodiment (FIG. 6b) the event identity decoder 50 can produce an output event bus 60 that is comprised of t groups of m-bit binary words. Each m-bit binary word is a single event output port 65 which reports the binary address of the occurring event. Therefore, by reading all single event output ports 65, system would get a "list" of all event addresses. One special address—perhaps the binary word "zero"—on one of the single event output ports 65 would indicate "no event". Other binary words on the single event output ports 65 would indicate the presence of an event and the binary word would provide its identity, or address. The event identity decoder 50 may be implemented in software, or be hardwired in an application specific integrated circuit (ASIC) or other appropriate hardware. Depending on the implementation of the event identity decoder 50, the singe event output ports 65, if used, can be represented as values in a computer memory or register.

Figure 6C:
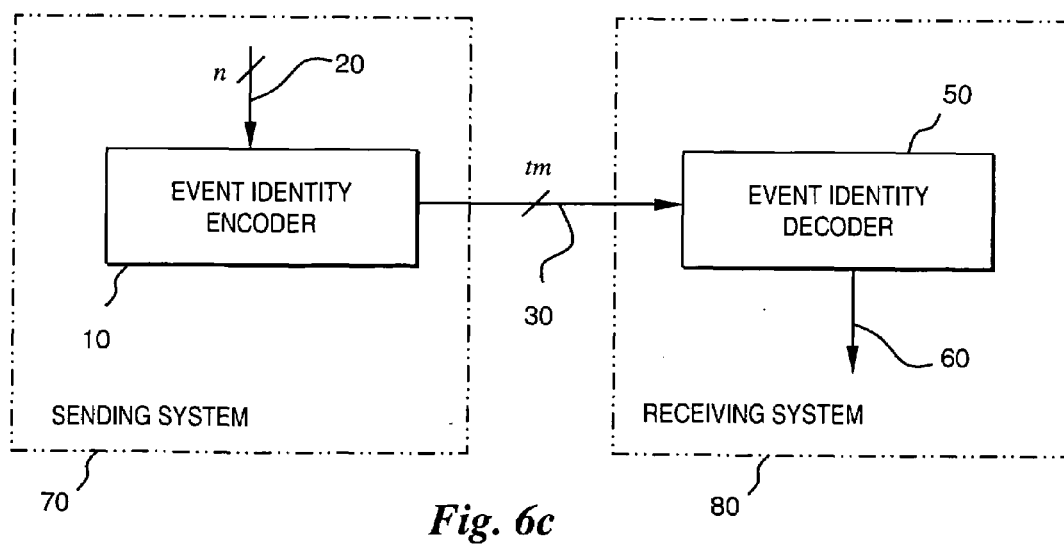

FIG. 6c illustrates that the event identity encoder 10 and the event identity decoder 60 may reside on a sending system 70 and receiving system 80 respectively. Thus the present invention enables the communication of event activity across integrated circuits, or other subsystems by only communicating over the event identity bus 30. The systems that could benefit from this communication are numerous, and include various perceptual and neuromorphic systems as discussed by many researchers.

So far in this description the word "event" implicitly implies a "time" associated with it. The information in many systems is represented by the timing of onset or duration of various "events". It has been discussed above that such systems include neural systems (both biological and artificial). Some analog-to-digital converter (A/D) architectures—such as single and dual slope A/D architecture—encode information of analog physical quantities by the timing of "events". And in my earlier invention—U.S. Pat. No. 5,699,278—I have shown how the timing of events can be used in image sensors and image processing. Further, physical quantities that are encoded as a frequency of analog, digital, or pulse train signals, also encode information in the timing of events.

Figure 7A:
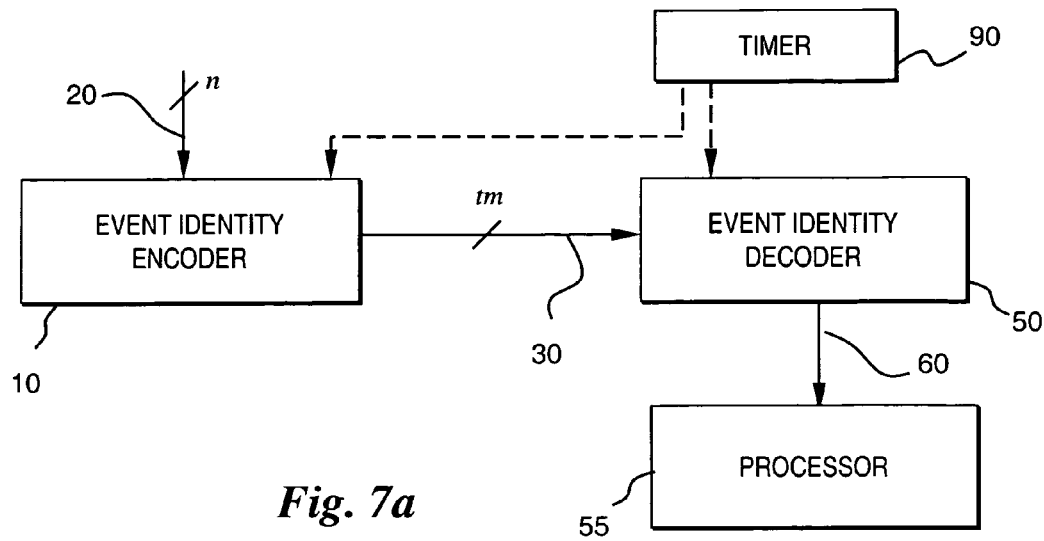
FIGS. 7a and 7b are block diagrams that illustrate how time may be associate with input events, event identity code, and output events.

FIG. 7a illustrates that the time is inherently measured across the system. Both the event identity encoder 10, and processor 55 can monitor the passage of time with one or more timers 90, and associate a timestamp or other time quantity with the onset, termination, and/or duration of events. FIG. 7a illustrates an asynchronous mode of operation in which events at the input of the event identity encoder 10 on the event bus 20 are not synchronized with any predetermined points in time. This enables the events to be processes as soon as they take place.

Figure 7B:
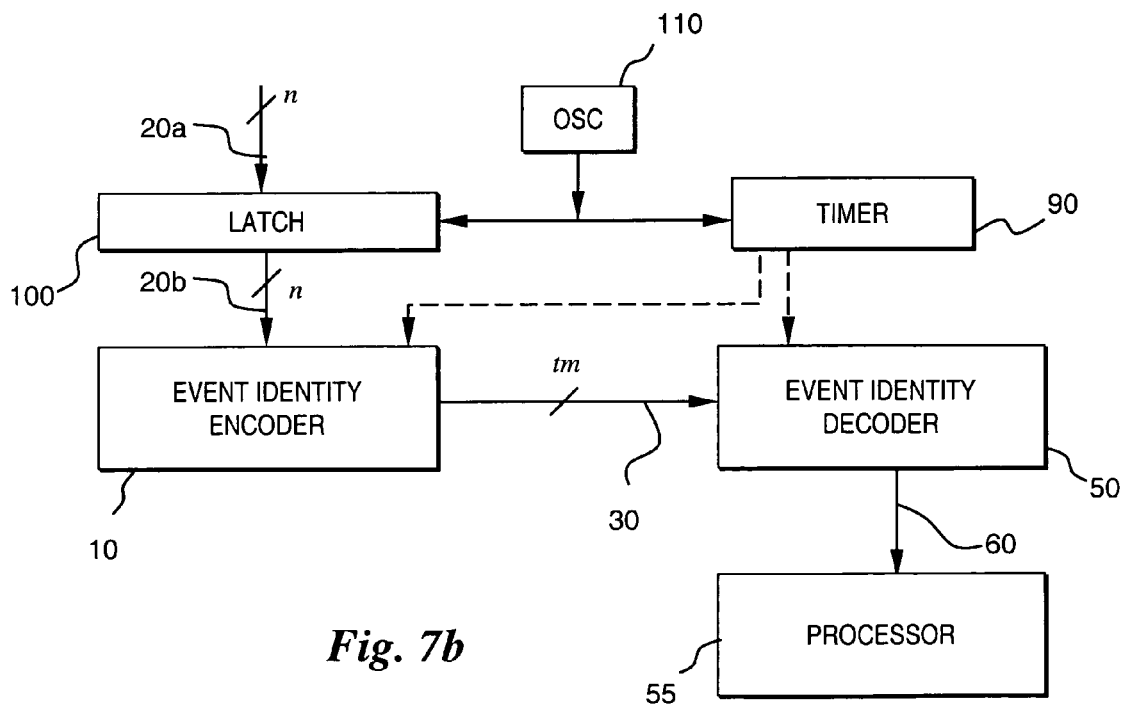

FIG. 7b illustrates that the events on an asynchronous event bus 20a are sampled by a latch 100 and held at predetermined points in time according to some external clock derived from an oscillator 110. The event identity encoder then receives the sampled events on a synchronous event bus 20b. The oscillator 110 may be used to derive a clock for the timer 90. The sampling periods in modern circuits can be very small, for example a few nanoseconds, or less. Therefore, for most practical purposes synchronous operation approaches the temporal fidelity of asynchronous operation while providing an added margin or robustness that is associated with synchronous electronic design. A particular choice between asynchronous and synchronous design will depend on the application, and those skilled in the art can readily adapt the present invention to both cases.

Figure 8A:
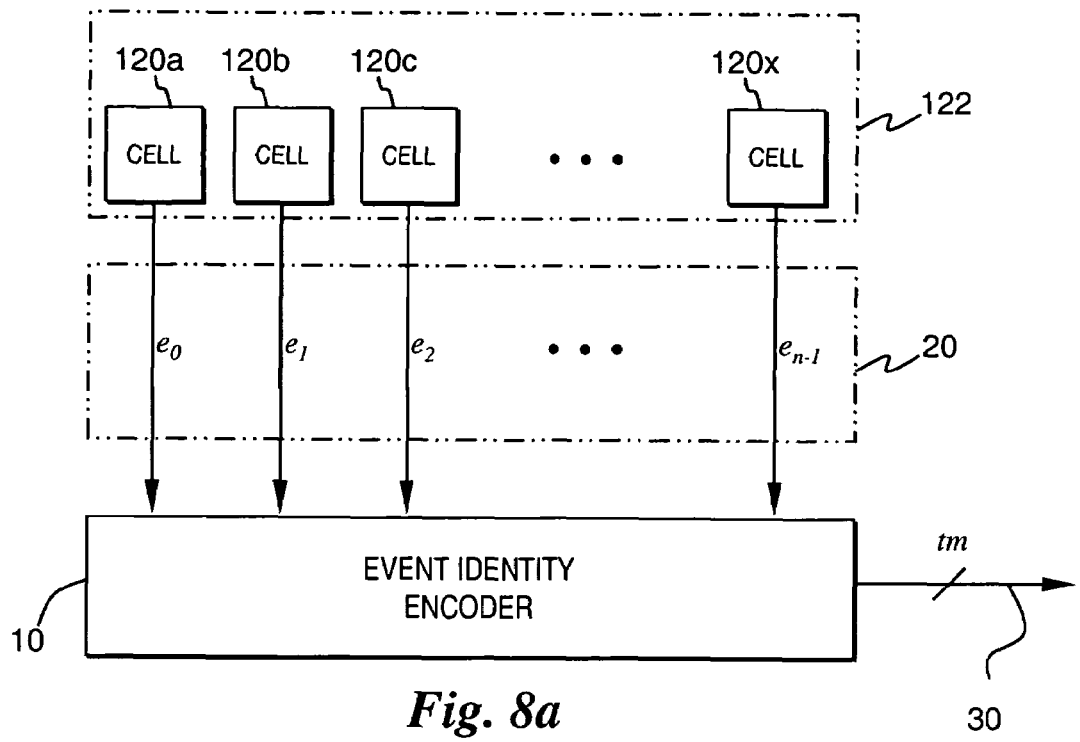
FIGS. 8a and 8b show an array of event-firing cells that provide events to the event identity encoder.

FIG. 8 illustrates that each event on the event bus 20 may arrive from an event-firing cell 120. For a plurality of events there is a plurality of cells 122. Normally, one thinks of events in electronic circuits as being instances of digital signal edges and/or digital signal pulses characterized by an onset edge and duration. FIG. 8a illustrates a cell that generates a pulse wherein both the onset and duration are determined based on some physical quantities and state internal to that particular cell. If the cell were an artificial neuron, the onset of events may be determined by the cell's level of activity. If the cell were a radiation sensitive pixel, the onset of its event may be related to the received radiation. If the cell is sampling an analog physical quantity, such as a voltage, charge, or current, the onset of its events may be determined by the magnitude of that physical quantity. In any case, the cell alone determines when the event is fired, or turned "on". Subsequently, the cell alone determines when the event signal is turned "off", that is the cell determines the duration of the event pulse.

Figure 8B:
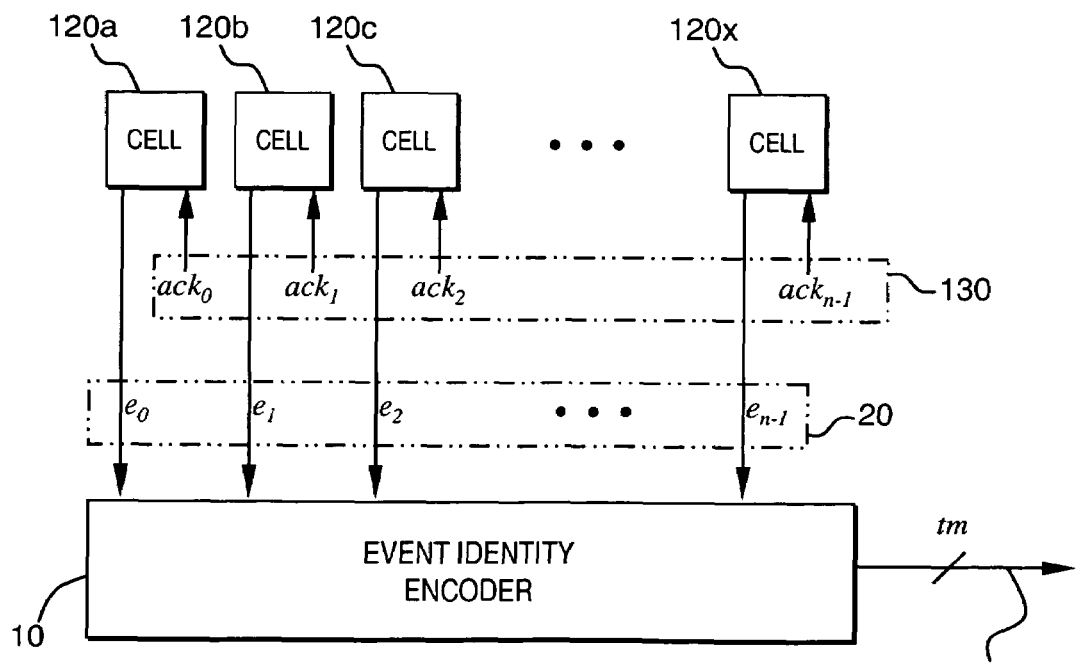

In some applications it may be advantageous to provide an enable "hand-shaking" between the event firing cells and the event identity encoder, so that all the events are reliably detected and processed. FIG. 8b illustrates an embodiment where event firing cells are provided with an acknowledge signal ack on an acknowledge bus 130 normally generated by the "master", in this case the event identity encoder 10 or any component down the signal chain, such as the processor 55, or event identity decoder 50. As is commonly known to those skilled in the art, the acknowledge signal would be used by a "peripheral", in this case the event firing cell 120, to hold its event "on" until the master has handled it. Thus while the cell controls the onset of an event, the cell may use the acknowledge signal to determine how long to keep the event active.

Figure 9:
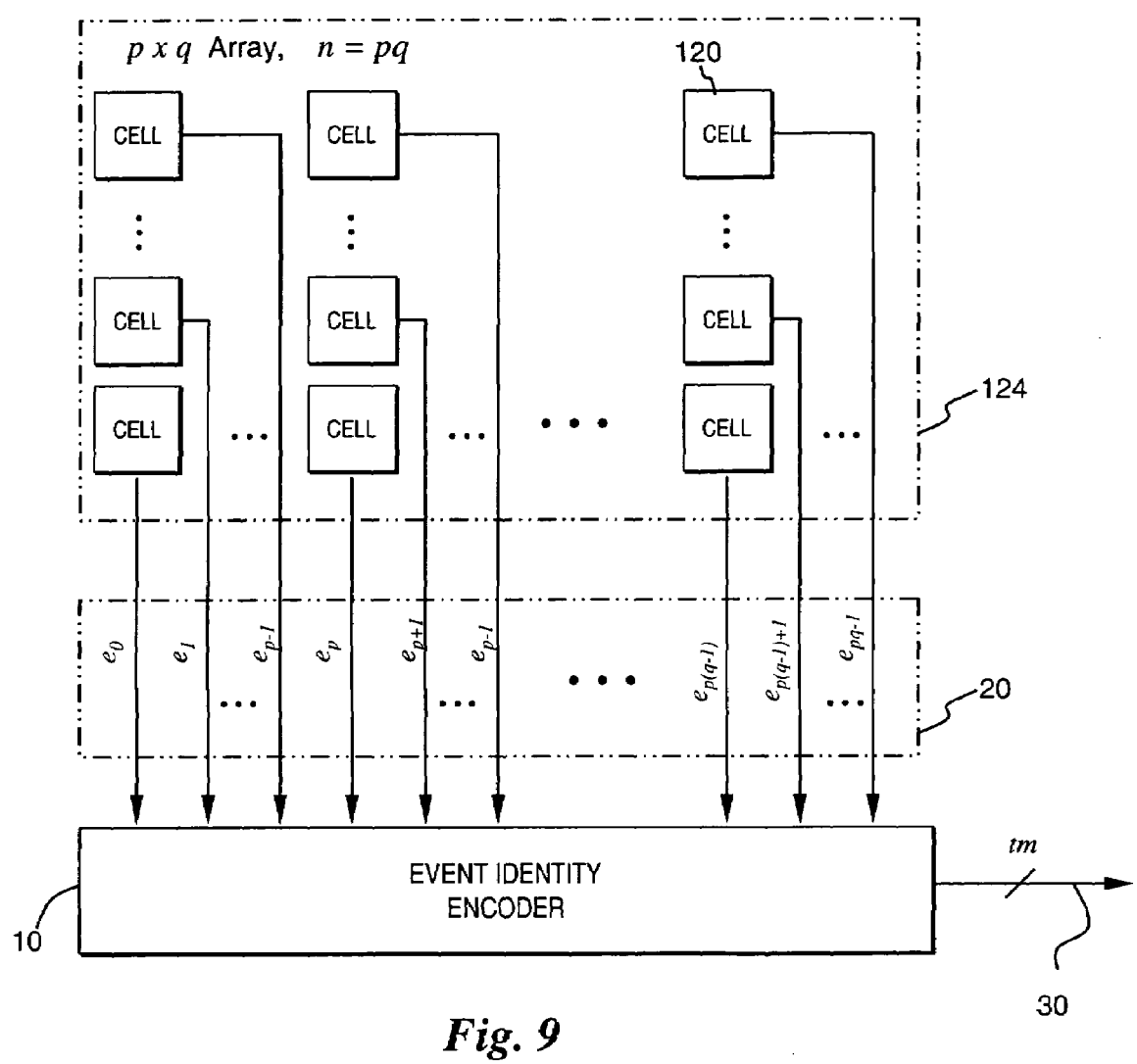
FIG. 9 is a schematic diagram of a plurality of event firing cells arranged in a two-dimensional array.

FIG. 9 illustrates that the plurality of cells 122 can be arranged in a two-dimensional array 124 or any other spatial configuration for that matter. Still, every cell 120 provides its event on a dedicated wire within the event bus 20.

Figure 10A:
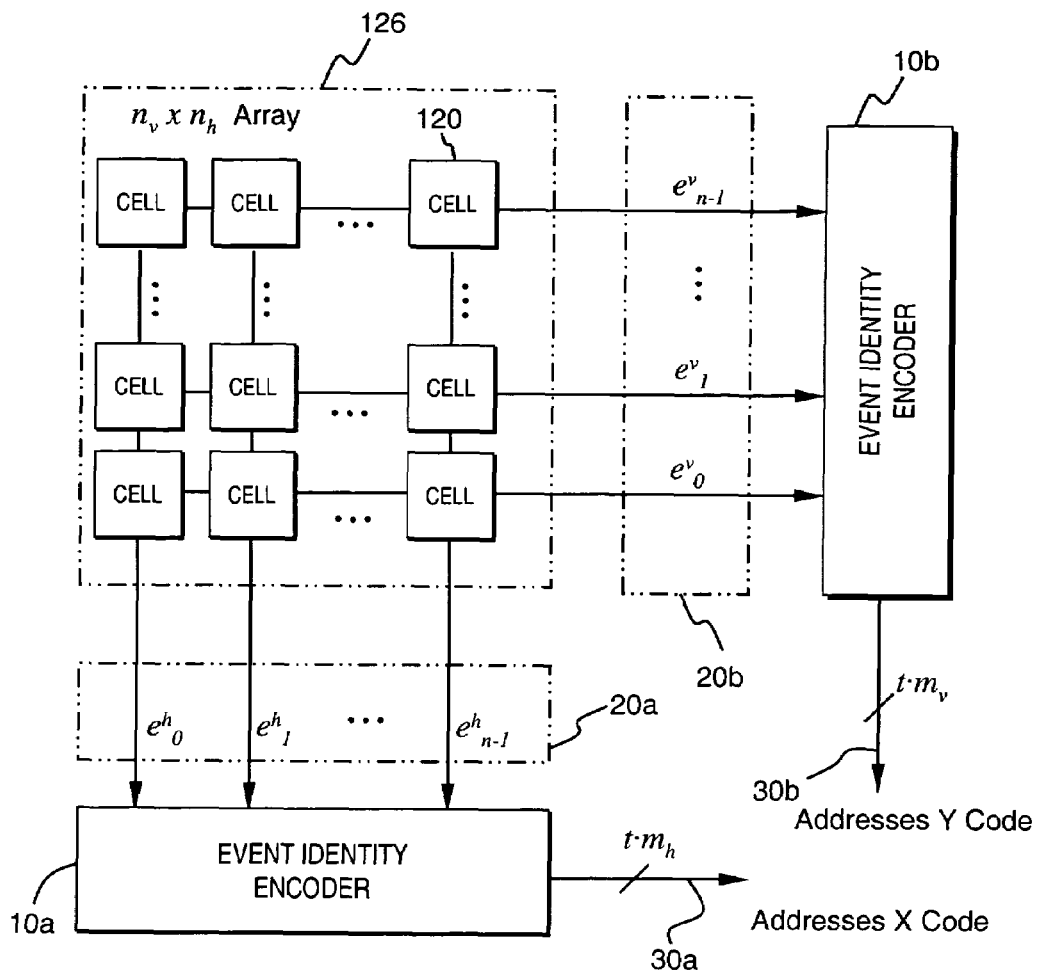
FIG. 10a is a plurality of cells arranged in a two-dimensional array in which cells along columns share vertical event bus wires, and cells along the rows share horizontal event bus wires.
Figure 10B:
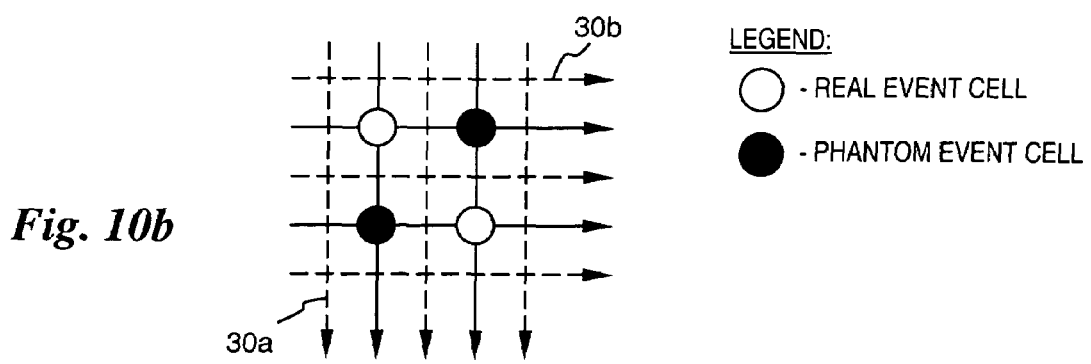
FIG. 10b illustrates one case when two events fire simultaneously.

Often the cells will fire infrequently, or only once during an observation period. Then the wires in the event bus 20 may be shared by multiple event generating cells provided that there is an additional mechanism to identify which cell on each such shared wire generated the event on the shared wire. One such embodiment is shown in FIGS. 10a and 10b. FIG. 10a shows a two-dimensional array 126 of cells 120. In the array of cells 126, all the cells 120 along each column share one vertical event wire corresponding to a particular column. Any cell along a column, potentially multiple cells along the column, will generate an event on a particular column bus. Similarly, all the cells 120 along each row of the array 126, share one horizontal event wire corresponding to a particular row. Therefore, any cell along the row firing an event will generate an event on that wire. The horizontal event bus 20b and vertical event bus 20a, observe column and row events bringing them to an event identity encoder 10. This encoder can be a single event identity encoder or be split in two independent encoders—a row identity encoder 10b and column identity encoder 10a.

The operation of the system embodiment is as follows. Cells are operating independently and firing their events according to their own internal state. The row and column event identity encoders 10a and 10b will detect the identity of potentially multiple events on horizontal and vertical event buses 20a and 20b. When the system finds multiple events on rows and columns, there can be several combinations of cells 120 responding inside the array 126. This ambiguity is illustrated in FIG. 10b for two simultaneously occurring events—the row event identity encoder 10b has identified two responses (indicated by the solid lines on the horizontal bus 30b), and the column event identity encoder 10a has also identified two responses (indicated by the two solid lines on the vertical bus 30a). In many cases these ambiguities can be resolved by the processor 55. When the situation of FIG. 10b occurs, the processor 55 may hypothesize that black pair of cells (phantom cells) could have generated simultaneous events or the white pair of cells (real event cells) could have generated simultaneous events. Now if at some other point in time (before or after) one or both of black phantom cells are identified as event generators, then we can conclude that the white pair of cells was the source of the situation in FIG. 10b. This way of resolving multiple events in the two-dimensional array 126 would be especially convenient if each cell fires only one event during an observation period, such as may be the case with pixels responding with one event after the reset signal (see my earlier invention U.S. Pat. No. 5,699,278). If the cells were oscillating cells producing repeated events at some rate, the processor 55 would need to keep track of the firing rate for each pixel and assume that the firing rate doesn't change abruptly from event to event.

Figure 11:
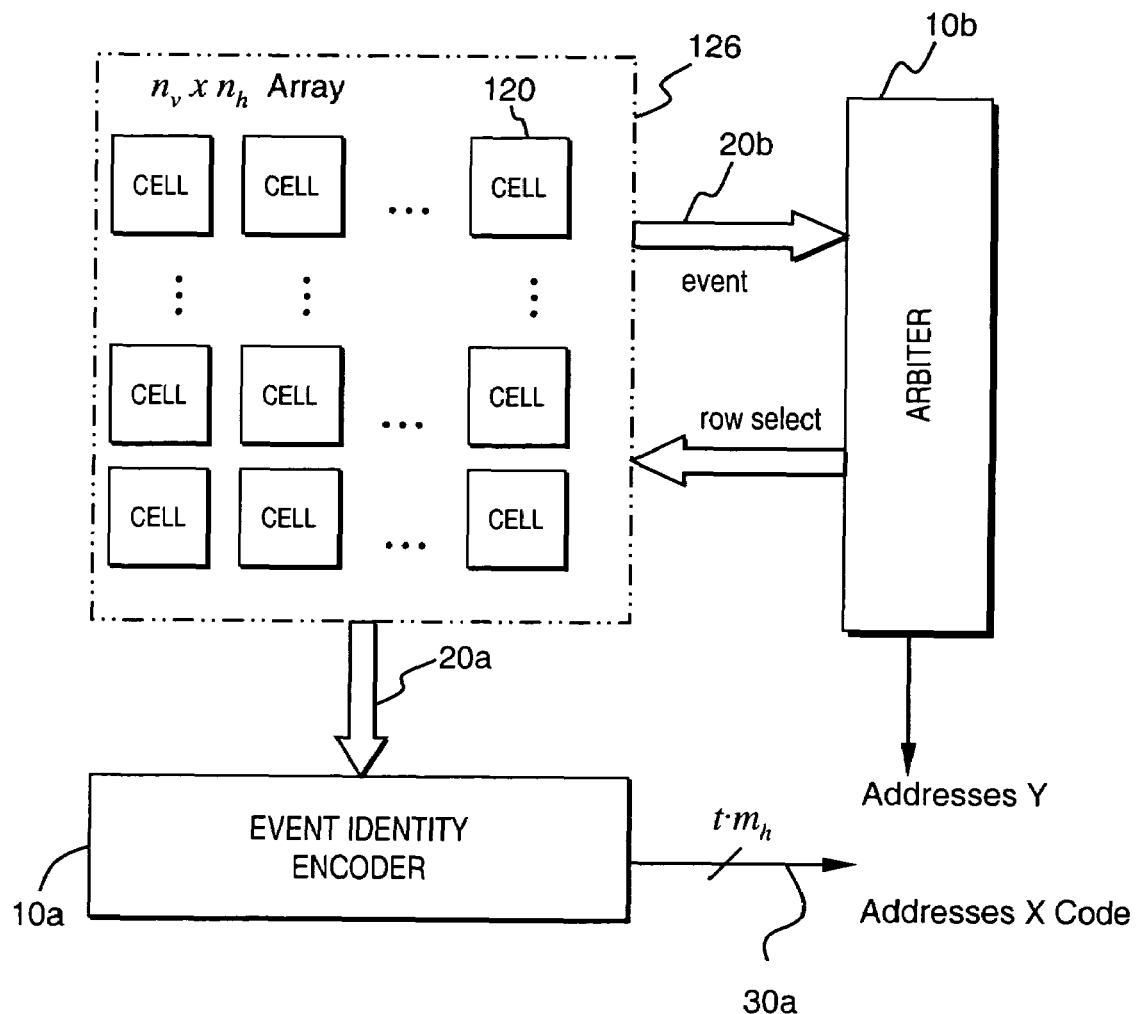
FIG. 11 is a two-dimensional array of the cells of FIG. 10a in which horizontal events are arbitrated for selecting only one row at a time, for communicating the selected row events to the vertical event identity encoder for identity encoding.

FIGS. 10a and 10b illustrate a more desirable way to resolve ambiguities in two-dimensional event firing arrays that share vertical and horizontal event wires. Nonetheless, a row arbiter 10b may be provided as shown in FIG. 11. The row arbiter 10b selects only one firing row at the time and selects its events to be communicated to the vertical bus. Then we would reduce the 2D problem to a number of 1D problems, each considered in sequence. In this case only a column event identity encoder 10a is needed, while the row address of a single selected row would be provided by the arbiter 10b. In this embodiment it may be advantageous to have cells that accept hand-shake acknowledge signals (not shown in FIG. 11, see FIG. 8b) thus enabling them to hold their events active until the arbiter 12 selects them and the column event encoder 10a handles them.

Figure 12A:
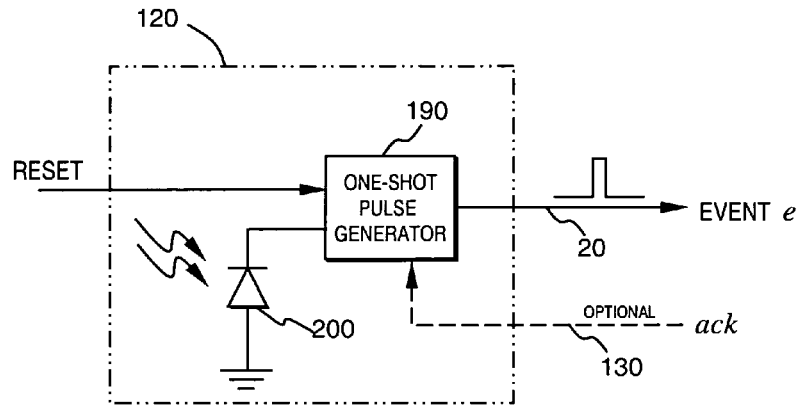
FIGS. 12a and 12b show an event firing photodetector cell appropriate for radiation and image sensing.
Figure 12B:
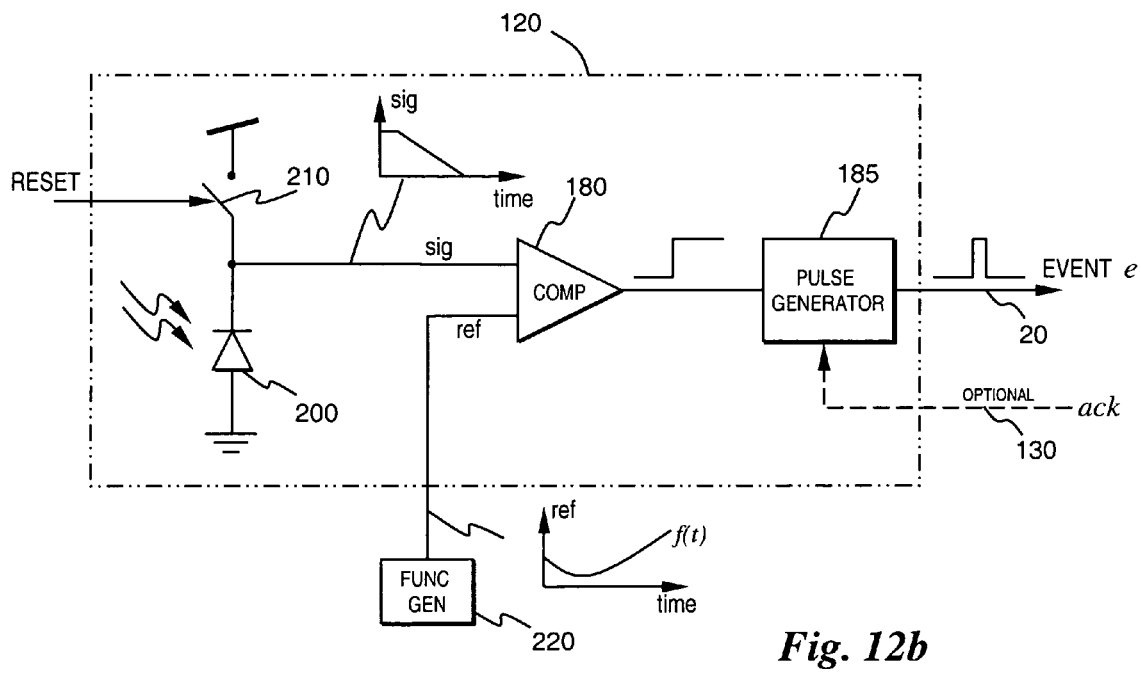

FIGS. 12a and 12b show an example of a radiation-sensitive cell 120 that would be appropriate to operate as a pixel in an imaging array, among other applications. Referring to FIG. 12a there is a one-shot pulse generator 190 that is first armed and put in the active state with a reset signal. Then in response to the received radiation the radiation-sensitive cell 120 fires a one-shot event at an instant in respect to the reset signal that is substantially monotonically related to the radiation received on its sensitive surface. After the event is fired, the one-shot pulse generator 190 enters an idle state and will not produce another event until it is armed and put into the active state by the reset signal again. Optionally, the one-shot pulse generator 190 may take an acknowledge signal from the acknowledge bus 130, and keep the pulse active until the acknowledge signal is received.

FIG. 12*b* shows one embodiment of the one-shot radiation-sensitive cell 120 of FIG. 12*a*. As is commonly known to those skilled in the art, a reset signal can initiate integration of the photocharge in a photodetector 200 by opening a switch 210. The photocharge accumulates substantially at a rate proportional to the radiation impinging on the photodetectors surface. Signal sig, which may be voltage, charge, current, or any other appropriate electronic quantity that can be derived from the accumulated photocharge, monotonically changes with the accumulated photocharge. At some point when a predetermined amount of photocharge is accumulated the radiation-sensitive cell 120 produces an event on the event bus 20. A reference signal ref may be used to control the predetermined amount of photocharge at which the radiation-sensitive cell 120 fires an event. The reference signal ref may be constant or changing in any fashion as long as the timing of the generated event can be sufficiently related to the impinging radiation.

The event generation by the cell 120 can be accomplished by generating an edge with a voltage, charge, or current comparator 180. The comparator output transitions through an edge at a time when the signal sig(t) and the reference ref(t) assume magnitude values that satisfy a certain predetermined mathematical relationship. One simple example is that the comparator would fire when sig(t)=ref(t), but depending on the comparator construction, the mathematical relationship could be f(sig(t))=g(ref(t)) or generally, ff(sig(t), ref(t))=0. A pulse generator 185 generates a pulse around the edge in the comparator output. This can be accomplished by (digitally) differentiating the comparator's output. The pulse is then communicated on the event bus 20. The duration of the pulse/event may be controlled by an optional acknowledge signal provided on the acknowledge bus 130. The reset signal and functional waveform of ref may be common for a plurality of pixels and can be generated externally.

Figure 13:
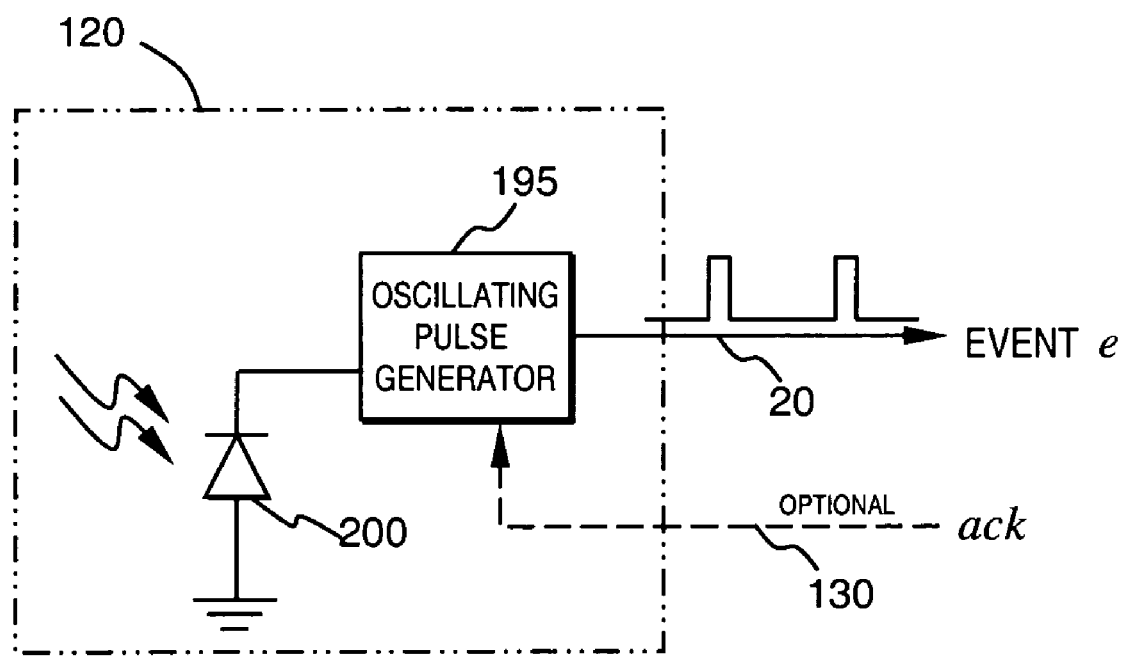
FIG. 13 shows a radiation controlled oscillating pulse generator.

FIG. 13 shows an oscillating radiation-sensitive cell 120. In this case, the cell fires a train of events with an oscillating pulse generator 195. The events repeated at a rate related to the impinging radiation. Those skilled in the art can come up with many different embodiments for this kind of cell. One example can be found in my earlier paper—N. Jankovic and V. Brajovic, "Light-Sensitive CMOS Ring Oscillator," *IEE Electronic Letters*, Vol. 36, No. 15, pp. 1281-1283, 2000.

Arranging radiation-sensitive cells 120 in an array results in an image sensor. The processor 55 (in FIG. 2) can store the identity and timing of the detected pixel events and process them to create representations of visual scenes useful for visualization, machine vision, and machine control. Traditionally, these representations are images whose pixel values reflect measurements of magnitudes of impinging radiation. However, these representations need not be necessarily arrays of values that represent absolute magnitudes of impinging radiation. As explained in my earlier patent application, Ser. No. 60/572,857, the appropriate representation for many visualization, machine vision, and other imaging tasks are not the absolute magnitudes of impinging radiation. Rather a representation that best describes the visual content of the scenes and images is more appropriate. Examples of such representations are described in the above referenced patent application and include a scene reflectance image or a tone mapped image in which a measured high dynamic range image is compressed into a low dynamic range replica while substantially maintaining the visual details and contrast of the scene, but in which knowledge of measured radiation magnitudes may have been lost. These representations can be obtained directly from the timing of pixel events collected by the processor 55.

Figure 14:
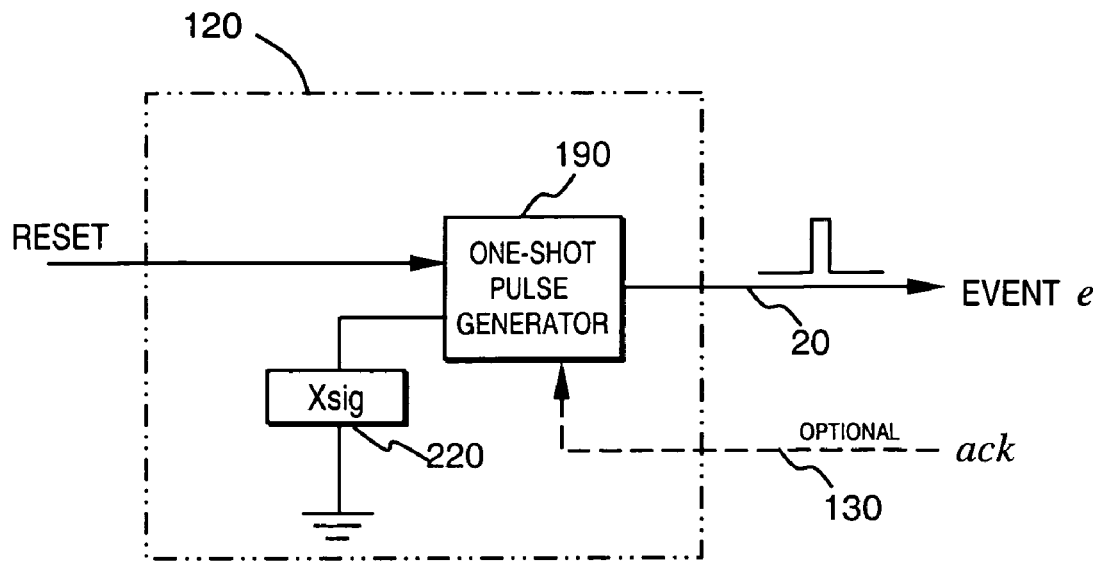
FIG. 14 shows a one-shot event generator controlled by an appropriate electric quantity, such as current, voltage, charge, etc., that is to be digitized into event timing for analog-to-digital conversion.

Due to the preceding teaching of how the event identity encoder 10 of present invention is used in conjunction with radiation-sensitive event-firing cells 120 is used for image sensing, it will now become obvious to those skilled in the art that this methodology can be extended to provide additional embodiments that are appropriate for analog-to-digital (A/D) conversion for example. FIG. 14 shows a one-shot event generating cell that generates events relative to the reset signals substantially at times determined by some analog quantity Xsig. Since events are inherently digital (they are "on" or "off"—"present" or "absent"), the address-event representation is an elegant way to digitize analog quantity Xsig. As a benefit of the present invention, a multi-point parallel A/D converter can be constructed with (a vast) plurality of inputs.

Figure 15:
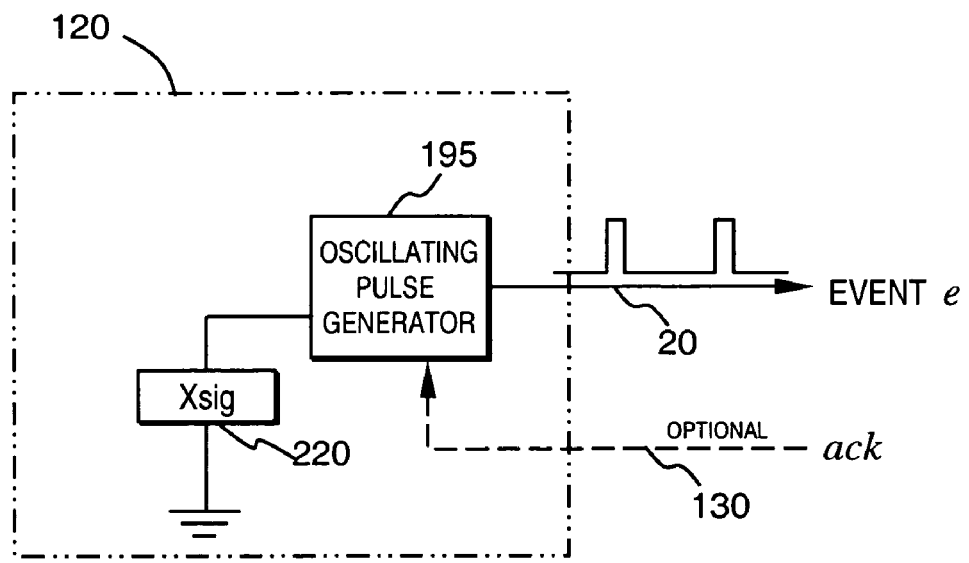
FIG. 15 shows an oscillating event generator controlled by an appropriate electric quantity that is to be digitized into a stream of temporal events and subsequently used in analog-to-digital conversion.

FIG. 15 shows an oscillating event-generating cell in which the rate of event firing is controlled by an analog quantity Xsig. In same applications, frequency is a natural way to represent many analog quantities (e.g., rate of rotation, rate of flow, rate of motion, etc.). Then according to the present invention, such analog quantities represented as repeatedly firing events can be conveniently digitized with high fidelity over large number of inputs.

The performance of an example system is discussed below. Assume a plurality of cells (e.g., neurons) that are periodically firing events. Event firing "anywhere in the network" is well described by the Poison distribution (Mortara, et al., "A communication scheme for analog VLSI perceptive systems," *IEEE Jour. Solid-State Circuits*, Vol. 30, No. 6, June 1995, pp. 660-669). The probability that k simultaneous events occur during a sampling interval T is given by:

$$p(k, n, f_o, T) = \frac{(nf_oT)^k}{k!} e^{-nf_oT}$$

where n is the number of neurons, and $f_o$ the average activity rate for each neuron. The average firing rate in the system is determined by simultaneous firing of all neurons and is:

$$\lambda = nf_o$$

In this analysis, assume that the event bus is sampled each T seconds. While one sample is being encoded during T seconds, no additional events are allowed to enter the encoding process. However, any events that may have fired during the current encoding interval are queued and will be sampled and encoded in the next sampling interval.

For reasonable event identity code bus 30 sizes (e.g., 32 and 64, or even 124 bits), a sufficient number of simultaneous events t can be encoded, achieving de facto lossless event communication. First, calculate the probability that more than t events fire simultaneously as:

$$p(k > t) = 1 - \sum_{i=0}^{t} \frac{(nf_oT)^i}{i!} e^{-nf_oT}$$

This is also the probability of loss, since it represents the probability that the maximum designed encoding capability t of the event identity encoder 10 was exceeded, resulting in loss. Next select a probability of loss to be 1% and calculate the maximum neuron firing rate for two examples, n=256 and n=1024. In calculations in this example T=10 ns, but more dense temporal sampling would improve performance and is also practically feasible. Results are shown in the table below. For comparison the probability of loss for the collision detecting code for the same conditions (Mortara et al.) was also calculated. Since the collision detecting code loses any two or higher order collisions, its loss is expectedly much greater. The arbitrated encoder would exhibit even greater loss in this example. First, it would have difficulty achieving the 10 ns-processing period if the typical binary search circuit with forward and backward pass is used (U.S. Pat. No. 5,404,556). Second, the arbitrated encoder would probably need to resort to encoding only one event among many in order to preserve any kind of coherence at firing rates shown in this example.

| No. of Cells $n = 2^m - 1$ | No. of bits in the event identity code | Top average system event rate | Top Average Single Cell Rate | This Evention p(loss) | Collision Detection Code (Mortara et al.) p(loss) |
|---|---|---|---|---|---|
| $255 \rightarrow m = 8$ | 32 bits $\rightarrow$ t = 4 | $12 \times 10^7$ [events/s] | 0.5 MHz | 0.01 | 0.37 |
|  | 64 bits $\rightarrow$ t = 8 | $35 \times 10^7$ [events/s] | 1.4 MHz | 0.01 | 0.86 |
| $1023 \rightarrow m = 10$ | 32 bits $\rightarrow$ t = 3 | $2.3 \times 10^7$ [events/s] | 80 KHz | 0.01 | 0.20 |
|  | 64 bits $\rightarrow$ t = 6 | $8.2 \times 10^7$ [events/s] | 228 KHz | 0.01 | 0.67 |

From the results in the table above, it can be seen that increasing the firing rate (for oscillating event-generating cells 120 in this example) to the point where about 1% of events are lost (due to exceeding the design simultaneous event capability t), the alternative techniques would lose 20-80% of events. The benefit of the present invention is clear. Furthermore, the one-shot event-firing cells 120 would not flood the encoder with as many events, which would result in further improved performance. All other address-event coders and systems proposed thus far that use the same, are less capable in terms of event handling performance, temporal and signal fidelity, and scaling ability.

While the invention has been described in terms of several embodiments, it will be apparent to those skilled in the art that various changes can be made to the described embodiments without departing from the invention as set forth in the following claims.

What is claimed is:

1. A method of encoding identity of events, the method comprising:
   Receiving a plurality of events represented by bits having first and second bit levels, wherein the first bit level indicates the presence of an event, and the second bit level indicates the absence of an event, the event bits forming an event bit pattern representing none, one, two, or more simultaneous events on an event bus; and
   Producing an event identity code from the event bit pattern using an encoder, said event identity code containing information for determnining identity of all present events when none, one, two or more events are simultaneously present in the event bit pattern, wherein the event identity code is determnined at the same time as any onset or any event termnination on the event bus, the event identity code not being a trivial replica of the event bit pattern.

2. The method of claim 1, further including the step of determining the event identities from the event identity code when one, two or more events are simultaneously present.

3. The method of claim 1, wherein the step of determining the event identity code from the event bit pattern comprises:
   combining the event bit pattern in a parity matrix network.

4. The method of claim 3, wherein the parity matrix network has dimensions of n×t×m, where n is the number of inputs carrying the event bits, t is a maximum recoverable number of simultaneous events, and m is a Galois Field size.

5. The method of claim 1, wherein the first bit level is a logic 1, and the second bit level is a logic 0.

6. An apparatus comprising:
   a plurality of inputs for receiving a plurality of events represented by bits having first and second bit levels, wherein the first bit level indicates the presence of an event, and the second bit level indicates the absence of an event, the event bits forming an event bit pattern; and
   an event address encoder for receiving the event bit pattern and for substantially instantaneously producing an event address code in response to the event bit pattern, the event address code containing the information for recovering identity, or address, of all the events when none, one, two or more events are simultaneously present in the event bit pattern, the event address code not being a trivial replica of the event bit pattern.

7. The apparatus of claim 6, wherein the event encoder comprises a parity matrix network.

8. The method of claim 7, wherein the parity matrix network has dimensions of n×tm, where n is the number of inputs receiving n event bits of the event bit patter, t is a maximum number of recoverable simultaneous events, and m is a Galois Field size.

9. An address encoder for encoding addresses of simultaneously occurring events comprising:
   a plurality of input wires for receiving a plurality of events, one event received per one wire, the events represented by bits having first and second bit levels, wherein the first bit level indicates the presence of an event, and the second bit level indicates the absence of an event, all of the event bits forming an event bit pattern;
   a plurality of output wires; and
   a plurality of exclusive OR gates connected between the input wires and output wires, wherein the exclusive OR gates correspond to a parity matrix to produce an event address code on the output wires, the event address code containing information for recovering identity of all present events when none, one, two or more events are simultaneously present in the event bit pattern on the input wires.

10. The encoder of claim 9, wherein the parity matrix has dimensions of n×tm, where n is the number of input wires, t is a maximum number of identifiable simultaneous events on the event bus, and m is a Galois Field size.

11. An apparatus comprising:
   means for generating a plurality of event bits having first and second bit levels, wherein the first bit level indicates the presence of an event, and the second bit level indicates the absence of an event, the event bits forming an event bit pattern; and means for receiving said event bit pattern and substantially instantaneously determining an event identity code, or event address code, in response to the event bit pattern, said event identity code or event address code containing the information for recovering identity, or address, of all present, or conversely all absent, events when none, one, two or more events are simultaneously present in the event bit pattern, the event identity code not being a trivial replica of the event bit pattern.

12. The apparatus of claim 11, wherein the means for generating a plurality of event bits comprises:
a plurality of cells, each receiving a controlling physical quantity, each cell having two states;
a reset means associated with said plurality of cells for simultaneously resetting or arming at least a portion of the cells to a first active state in response to a reset signal;
an event-generating means, in each cell of said portion of cells, for generating an event for signaling outside of the cell, said event generated at an instant the cell transitions from said first active state to a second idle state, the duration of said first active state determined by said event-generating means substantially as a monotonic function of the magnitude of the controlling physical quantity received by said cell, wherein any two cells from said plurality of cells receiving the controlling physical quantity of substantially different magnitude produce said events at different times.

13. A method for determining identity of simultaneous events comprising the steps of:
communicating a plurality of event bits over an event bus comprised of a plurality of wires, one of the event bits communicated per one said wire, the event bits having first and second bit levels, wherein the first bit level indicates the presence of an event, and the second bit level indicates the absence of an event, the event bits forming event bit pattern; and
producing an event identity code with an event identity encoder on an event identity code bus, in response to said event bit pattern, said event identity code simultaneously encoding an identity, a wire location, or an address of all present events in the event bit pattern, when none, one, two or more events are simultaneously present in the event bit pattern on the event bus, the event identity code not being a trivial replica of the event bit pattern, wherein the step of producing an event identity code is performed substantially at the same time as the step of communicating the event bits over the event bus so as to reflect the change in the event identity code substantially at the time of any event onset or any event termination on the event bus; and
communicating the event identity code over an event identity code bus.

14. The method of claim 13, wherein the step of producing an event identity code includes the steps of:
identifying within the event identity code the addresses of all absent events in said event bit pattern on the event bus.

15. The method of claim 13, further including the steps of:
communicating said event identity code to a processor; and
associating the event identity code with a timestamp, using the processor, the timestamp being an indication of instances when the events identified in the event identity code occurred on said event bus.

16. The method of claim 13, wherein the step of producing the event identity code includes the steps of:
producing the syndrome of the event bit pattern supplied on the event bus; and
communicating the syndrome bits on the event identity code bus.

17. The method of claim 13, further including the steps of:
communicating the event identity code to an event identity decoder; and
decoding the event identity code to create an output bit pattern on an output event bus that substantially replicates said event bit pattern on the event bus.

18. The method of claim 13, further including the steps of:
communicating the event identity code to an event identity decoder; and
producing a set of location addresses for all present events on the event bus by decoding the event identity code.

19. The method of claim 13, further including the steps of:
communicating the event identity code to an event identity decoder;
decoding the event identity code to produce a set of individual addresses, each individual address identifying one event from the set of all simultaneously occurring events on the event bus; and
associating a timestamp with the produced set of individual event addresses, the timestamp being an indication of instances when the corresponding events occurred on the event bus.

20. The method of claim 13, further including the steps of:
receiving a controlling physical quantity by event-generating cells, each cell having at least two states;
simultaneously resetting or arming at least a portion of the event-generating cells to a first active state in response to a reset signal;
generating an event with an event-generating means situated in each cell of said portion of cells, said event generated substantially at an instant the cell transitions from said first active state to a second idle state, the duration of said first active state determined by said event-generating means substantially as a monotonic function of the magnitude of the controlling physical quantity received by each cell, wherein any two cells from said portion of cells receiving the controlling physical quantity of substantially different magnitude generate said events at different times; and
communicating said generated events from said event-generating cells to the event bus.

21. The method of claim 20, further including the steps of:
processing the event identity code together with said associated timestamps to substantially reconstruct magnitude of said controlling physical quantity received by said cells.

22. The method of claim 13, wherein the step of communicating the plurality of event bits over the event bus further includes latching and synchronizing of the said event bits.

23. The method of claim 13, further including the steps of:
generating said events by event-generating cells;
sharing of said event bus by allowing multiple event-generating cells to communicate their events to a single corresponding event bit in the event bit pattern on the event bus, whereby an event is created at the single corresponding event bit whenever either one of the multiple event-generating cells on the corresponding event bit generates an event; and
disambiguating with independent disambiguating means the identity of the multiple event-generating cells communicating events to a single corresponding event bit.

24. The method of claim 23, wherein the step of disambiguating with disambiguating means involves arbitration among said multiple event-generating cells that communicate their events to a single corresponding event bit in the event bit pattern on the event bus.

25. A method for image sensing comprising the steps of:
receiving radiation with a plurality of radiation-sensitive event-generating cells disposed on a surface;
generating events with each event-generating cell at event times that are uniquely related to the magnitude of received radiation by the each event-generating cell, each of said events represented by a bit having at least first and second bit states, wherein the first bit state indicates the presence of an event, and the second bit state indicates the absence of an event, the event bits forming an event bit pattern; and
producing an event identity code by an event identifying means in communication with the event-generating cells, the event identity code produced from the event bit pattern and containing the identity of all events in the event bit pattern when none, one, two, or more events are simultaneously generated by the event-generating cells, the event identity code produced substantially at the same time as the step of generating an event bit with each event generating cell so as to reflect the change in the produced event identity code of the generated events substantially at the time of any event onset or any event termination, the event identity code not being a trivial replica of the event bit pattern; and
storing the event identity code paired with associated timestamps, the timestamps indicating time when events identified in the identity code occurred.

26. The method for image sensing of claim 25, wherein the step of generating an event with each event-generating cell includes the steps of:
resetting the event-generating cells with a reset signal common to at least a portion of the plurality of radiation-sensitive event-generating cells, thus causing the cells to enter into an active state;
transitioning each event-generating cell from said active state into an idle state, duration of active state uniquely determined to the magnitude of the radiation received by each cell;
generating an event when the cell transitions from said active to said idle state; and
holding the cells in the idle state.

27. The method for image sensing of claim 25, further including a step of:
converting said event identity code paired with associated timestamps to values, or data representations, descriptive of visual scenes sensed by the radiation-sensitive cells.

28. A method for simultaneous parallel analog-to-digital conversion comprising the steps of:
receiving a physical quantity with a plurality of event-generating cells;
generating events with each event-generating cell at event times that are uniquely related to the magnitude of the physical quantity received by the each event-generating cell, each of said events represented by a bit of information having at least first and second bit states, wherein the first bit state indicates the presence of an event, and the second bit state indicates the absence of an event, the event bits forming an event bit pattern;
communicating the event bit pattern via an event bus;
receiving the event bit pattern from the event bus by an encoding means;
producing an event identity code with the encoding means, the identity code containing the identity of all simultaneously generated events, the identity produced substantially at the same time as the step of generating an event with each event-generating cell so as to substantially reflect the change in the produced identity of the generated events substantially at the same time as any event onset or any event termination, the event identity code not being a trivial replica of the event bit pattern; and
storing the event identity code paired with associated timestamps with a processing means, the timestamps substantially indicating when the events identified in the event identity code occurred.

29. The method for simultaneous analog-to-digital conversion of claim 28, further including a step of:
converting said event identity code paired with associated timestamps into digitized values representative of the magnitude of the received physical quantity by the each corresponding cell, the converting performed with the processing means.

30. The method of claim 1, wherein the step of determining an event identity code from the event bit pattern, produces an event identity code represented with t×m number of bits, where t×m<n, n being a number of bits representing event bit pattern.

31. The apparatus of claim 6, further including a decoder for receiving said event address code and recovering individual event identities from the event address code.

32. The apparatus of claim 11, further including a decoder for receiving said event identity code, or event address code, and recovering individual event identities, or event addresses, from the event identity code.

33. The apparatus of claim 12, wherein each cell in said plurality of cells includes:
a photodiode for receiving a portion of the controlling physical quantity in the form of radiant energy, said photodiode converting said radiant energy to a sensor signal sig(t); and
said event-generating means in each of said cells comprising a comparator means for receiving and comparing said sensor signal sig(t) and a second signal ref(t), and producing said event when the sensor signal and the second signal substantially assume values that satisfy a predetermined mathematical relationship f(sig(t), ref(t))=0.

34. The apparatus of claim 33, wherein each of said comparator means producing said event when the sensor signal and the second signal are substantially equal.

35. The apparatus of claim 33, wherein a sensor signal is determined by the photodiode as a time integral of said radiant energy.

36. The method for image sensing of claim 25, wherein the step of storing the event address code includes a step of:
extracting an identity of individual events from the event address code.

37. The method for image sensing of claim 26, wherein the step of transitioning each event-generating cell into an idle state is initiated by comparing the radiation magnitude received by each cell to a second signal common to at least a portion of the plurality of radiation-sensitive event-generating cells, the second signal being constant in time, or changing in time.

38. The method for image sensing of claim 26, wherein the step of generating an event includes the steps of:
initiating a pulse by the onset of each cell idle state, and terminating the pulse in response to an acknowledge signal.

39. The method for image sensing of claim 25, wherein the step of generating events with each event-generating cell includes the steps of:

causing the event-generating cells to oscillate using a radiation-sensitive oscillating means situated in each cell, the oscillation causing the cell to repeatedly change state from a first state to a second state, the duration of at least one of said first state and said second state being uniquely related to the magnitude of the received radiation by the radiation-sensitive oscillating means in each cell; and generating an event when the cell transitions from the first state to the second state, or from second state to the first state, or both.

40. The method for image sensing of claim 27, wherein the step of converting said associated timestamps to values descriptive of visual scenes sensed by the radiation-sensitive cells includes a step of:

producing an image of visual scenes sensed by the radiation-sensitive cells, wherein values of pixels of the produced image represent the magnitude of the radiation received by each of said radiation-sensitive event-generating cell.

41. The method for image sensing of claim 27, wherein the step of converting said associated timestamps to values descriptive of visual scenes sensed by the radiation-sensitive cells includes a step of:

producing an image of visual scenes sensed by the radiation-sensitive cells, wherein values of pixels of the produced image do not represent the magnitude of the radiation received by each of said radiation-sensitive, event-generating cells.

42. The method for image sensing of claim 27, wherein the step of converting said associated timestamps to values descriptive of visual scenes sensed by the radiation-sensitive cells includes a step of:

producing an image of visual scenes sensed by the radiation-sensitive cells, wherein values of pixels of the produced image are tone mapped values of the sensed radiation magnitudes, the pixel values not directly indicative of the radiation magnitude received by the radiation-sensitive cells.

43. The method for image sensing of claim 27, wherein the step of converting said associated timestamps to values descriptive of visual scenes sensed by the radiation-sensitive cells includes a step of:

producing reflectance images of the visual scenes sensed by the radiation-sensitive cells.

44. The method of analog-to-digital conversion of claim 28, further including a step of:

producing an identity of each individual event whose identity is encoded in the event address code.

\* \* \* \* \*